US011063390B2

(12) United States Patent
Furugoori (10) Patent No.: US 11,063,390 B2
(45) Date of Patent: Jul. 13, 2021

(54) CONNECTOR AND POWER SUPPLY CIRCUIT CUT-OFF DEVICE

(71) Applicant: Yazaki Corporation, Tokyo (JP)

(72) Inventor: Osamu Furugoori, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/890,082

(22) Filed: Jun. 2, 2020

(65) Prior Publication Data

US 2020/0388959 A1    Dec. 10, 2020

(30) Foreign Application Priority Data

Jun. 6, 2019   (JP) .............................. JP2019-106303

(51) Int. Cl.
| | |
|---|---|
| *H01R 13/629* | (2006.01) |
| *H01R 13/502* | (2006.01) |
| *H01R 13/53* | (2006.01) |
| *H01R 13/639* | (2006.01) |
| *H01R 13/70* | (2006.01) |

(52) U.S. Cl.
CPC ..... *H01R 13/62938* (2013.01); *H01R 13/502* (2013.01); *H01R 13/53* (2013.01); *H01R 13/62955* (2013.01); *H01R 13/639* (2013.01); *H01R 13/70* (2013.01)

(58) Field of Classification Search
CPC ............ H01R 13/193; H01R 13/62938; H01R 13/502; H01R 13/53; H01R 13/62955; H01R 13/639; H01R 13/70; H01R 23/6833

USPC ......................................................... 439/259
See application file for complete search history.

(56) References Cited

U.S. PATENT DOCUMENTS

| | | | | |
|---|---|---|---|---|
| 5,722,841 A | * | 3/1998 | Wright ................... | H01R 4/646 174/78 |
| 6,019,625 A | * | 2/2000 | Nimura ............ | H01R 13/62905 439/259 |
| 6,083,048 A | * | 7/2000 | Yamaguchi ........ | H01R 13/6596 439/607.05 |

(Continued)

FOREIGN PATENT DOCUMENTS

| | | |
|---|---|---|
| DE | 20 2015 102 096 U1 | 9/2016 |
| JP | 2012-243559 A | 12/2012 |
| JP | 2013-62043 A | 4/2013 |

*Primary Examiner* — Gary F Paumen
(74) *Attorney, Agent, or Firm* — Sughrue Mion, PLLC (57) ABSTRACT

A connector includes a first and second connector housings, a first and second terminals provided in the first and second connector housings, the second terminal including contact pieces with a gap therebetween, the gap being larger than a width dimension of the first terminal. The second connector housing includes pressing plate portions. The second terminal is to be accommodated between the pressing plate portions, the second terminal being displaceable between a first position and a second position, a part of the contact pieces extends beyond distal ends of the pressing plate portions when the second terminal is in the first position, the part of the contact pieces are completely retracted into a space between the pressing plate portions when the second terminal is in the second position. The contact pieces are to be pushed such that the contact pieces contact the terminal plate portions.

6 Claims, 11 Drawing Sheets

(56) References Cited

U.S. PATENT DOCUMENTS

| | | | | |
|---|---|---|---|---|
| 6,171,150 B1 * | 1/2001 | Saito | ............... | H01R 9/0512 |
| | | | | 439/607.51 |
| 6,384,335 B1 * | 5/2002 | Saito | ............... | H01R 9/0518 |
| | | | | 174/74 R |
| 6,491,530 B2 * | 12/2002 | Koide | ............... | H01R 13/193 |
| | | | | 439/92 |
| 2013/0065412 A1 | 3/2013 | Ikeda et al. | | |
| 2017/0133790 A1 | 5/2017 | Yamane et al. | | |

\* cited by examiner

CONNECTOR AND POWER SUPPLY CIRCUIT CUT-OFF DEVICE

CROSS-REFERENCE TO RELATED APPLICATION

The present application claims priority to Japanese Patent Application No. 2019-106303 filed on Jun. 6, 2019, the entire content of which is incorporated herein by reference.

TECHNICAL FIELD

The present invention relates to a connector and a power supply circuit cut-off device.

BACKGROUND

In a vehicle such as an electric vehicle or a hybrid vehicle, in order to ensure work safety during maintenance of an electric system or the like, a power supply circuit cut-off device referred to as a service plug that cuts of electric conduction between a power supply and a load is provided.

A related art power supply circuit cut-off device includes a first housing, a second housing being attachable to and detachable from the first housing. A female terminal provided in the first housing and a male terminal provided in the second housing function as a power supply switch (for example, see JP2012-243559A and JP2013-062043A). In the power supply circuit cut-off device, by the second housing being attached to or detached from the first housing thereby making the male terminal being inserted into or removed from the female terminal, the power supply switch is turned on or off.

In the above power supply circuit cut-off, every time the second housing is attached to and detached from the first housing, the male terminal is inserted into and removed from the female terminal, and contact portions of the male terminal and the female terminal slide on each other. Therefore, when the attaching and detaching operation of the second housing with respect to the first housing is repeated, surfaces of the contact portions where the female terminal and the male terminal slide on each other may be scrapped. Further, by plating applied to surfaces of the terminals being scraped, a base portion is exposed, resulting in the exposed portion being oxidized and electrical resistance being increased. As a result, connection reliability may be decreased.

SUMMARY

Illustrative aspects of the present invention provide a connector and a power supply circuit cut-off device that can maintain high connection reliability of terminals connected to each other.

According to an aspect of the embodiments described above, a connector includes a first connector housing, a second connector housing configured to be fitted to and detached from the first connector housing, a first terminal provided in the first connector housing, the first terminal including a pair of terminal plate portions with a plate portion provided between the pair of terminal plate portions, the plate portion having an electrical insulation property, and a second terminal provided in the second connector housing, the second terminal having a U shape, the second terminal including contact pieces facing each other with a gap between the contact pieces, the gap being larger than a width dimension of the first terminal, the first terminal being configured to be inserted into the gap when the second connector housing is fitted to the first connector housing, the first terminal being configured to be removed from the gap when the second connector housing is detached from the first connector housing. The second connector housing includes a pair of pressing plate portions extending toward a direction in which the second connector housing is fitted to the first connector housing. The second terminal is configured to be accommodated between the pressing plate portions, the second terminal being configured to be displaceable between a first position and a second position, a part of the contact pieces being configured to extend beyond distal ends of the pressing plate portions when the second terminal is in the first position, the part of the contact pieces being configured to be completely retracted into a space between the pressing plate portions such that the part of the contact pieces do not extend beyond the distal ends of the pressing plate portions when the second terminal is in the second position. The second terminal is configured to be displaced from the first position to the second position by the second terminal being retracted into the space between the pressing plate portions when the second connector housing is completely fitted to the first connector housing, the contact pieces being configured to be pushed toward the first terminal by the pressing plate portions such that the contact pieces contact the terminal plate portions.

Other aspects and advantages of the invention will be apparent from the following description, the drawings and the claims.

BRIEF DESCRIPTION OF THE DRAWINGS

FIGS. 9A and 9B show states of the connector in which FIG. 9A is a partial cross-sectional side view of the connector in a finally fitted state and in which

FIGS. 10A and 10B show states of a sub-switch unit of the connector in which FIG. 10A is a cross-sectional view of the sub-switch unit of the connector in the finally fitted state and in which

DETAILED DESCRIPTION

Figure 1:
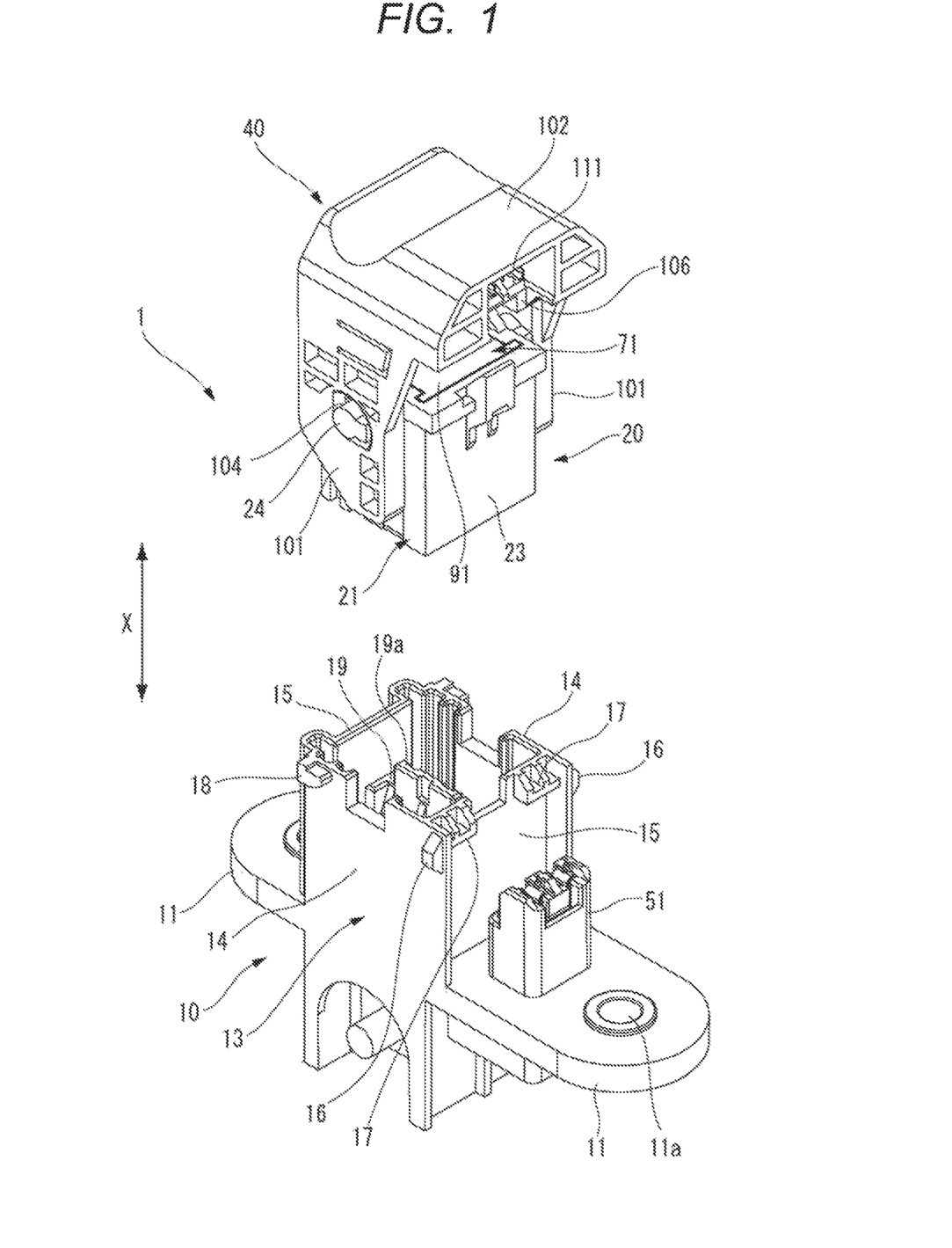
FIG. 1 is a perspective view of a connector according to the present embodiment in a state where a second connector housing is separated from a first connector housing.
Figure 2:
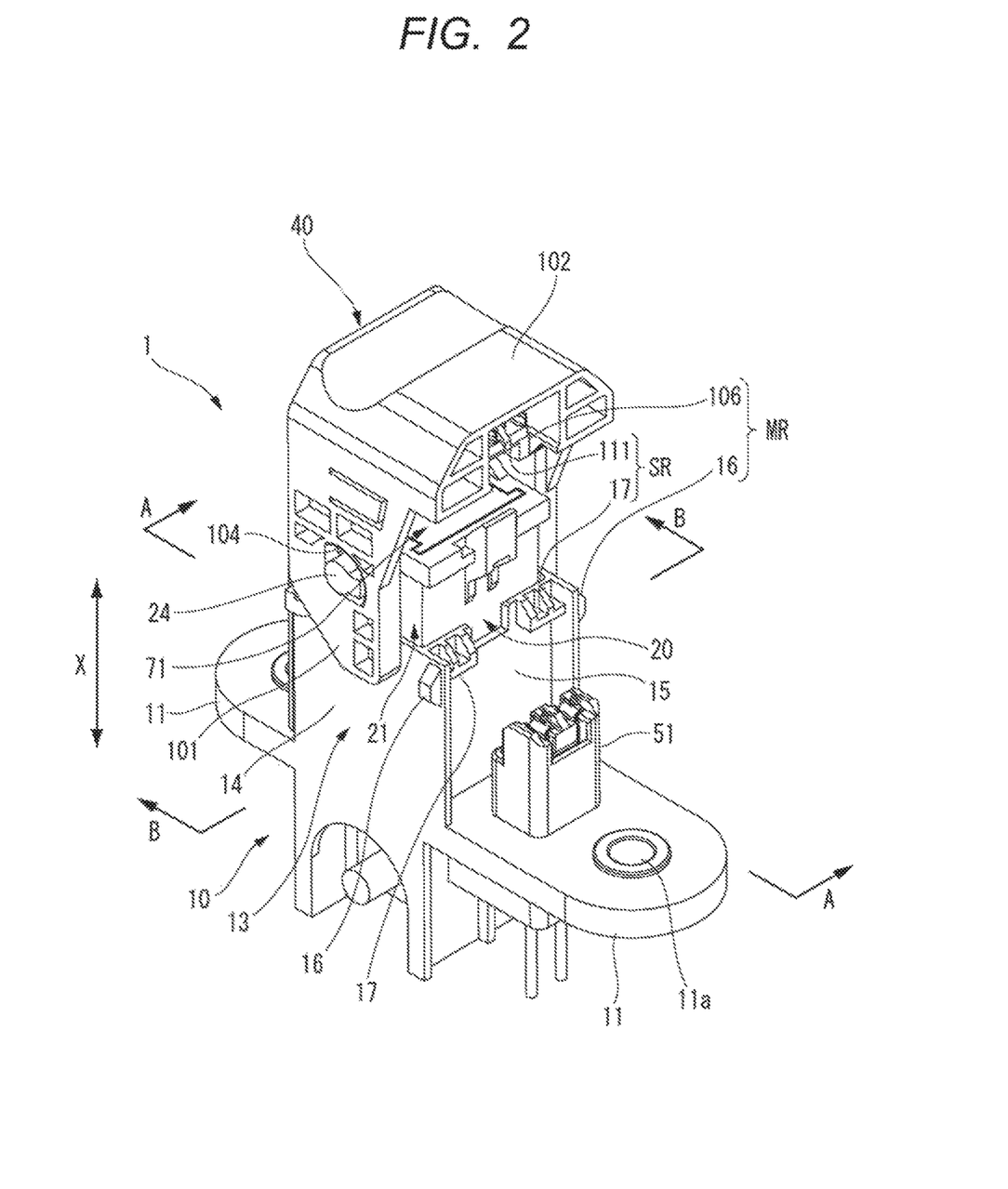
FIG. 2 is a perspective view of the connector according to the present embodiment in a detached state.
Figure 3:
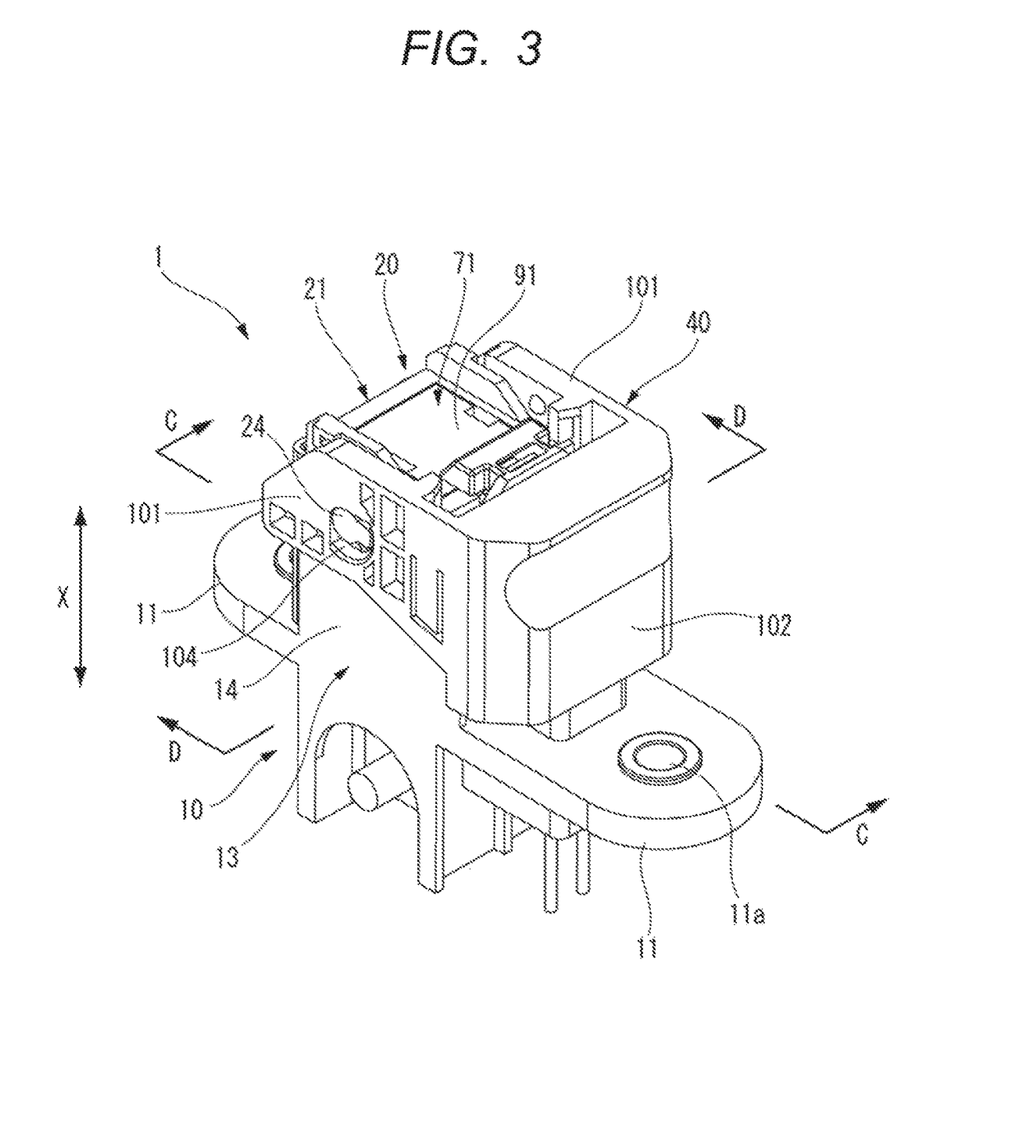
FIG. 3 is a perspective view of the connector according to the present embodiment in a finally fitted state.

Hereinafter, exemplary embodiments of the present invention will be described in detail with reference to the drawings. FIG. 1 is a perspective view of a connector according to the present embodiment in a state where a second connector housing is separated from a first connector housing. FIG. 2 is a perspective view of the connector according to the present embodiment in a detached state. FIG. 3 is a perspective view of the connector according to the present embodiment in a finally fitted state.

As shown in FIGS. 1 to 3, a connector 1 according to the present embodiment includes a first connector housing 10 and a second connector housing 20. Both the first connector housing 10 and the second connector housing 20 are molded from a synthetic resin having electrical insulation properties. The second connector housing 20 is fitted to and detached from the first connector housing 10 along an insertion and removal direction X in which the second connector housing 20 is fitted to and detached from the first connector housing 10. The second connector housing 20 includes a lever 40 made of a synthetic resin. The lever 40 is configured to be rotatable with respect to the second connector housing 20, and a fitting force is applied to the second connector housing 20 and the first connector housing 10 by rotating the lever 40. In this way, the connector 1 is a lever-type connector in which the second connector housing 20 is fitted to the first connector housing 10 by a rotation operation of the lever 40.

The connector 1 is used, for example, in a vehicle such as an electric vehicle or a hybrid vehicle, as a power supply circuit cut-off device referred to as a so-called service plug that is configured to cut off electric conduction between a power supply unit and a load to ensure work safety in maintenance work of an electric system or the like. Specifically, the power supply unit and the load are electrically conducted by the second connector housing 20 being joined to the first connector housing 10. When the second connector housing 20 is detached from the first connector housing 10, the electric conduction between the power supply unit and the load is cut off.

Figure 4:
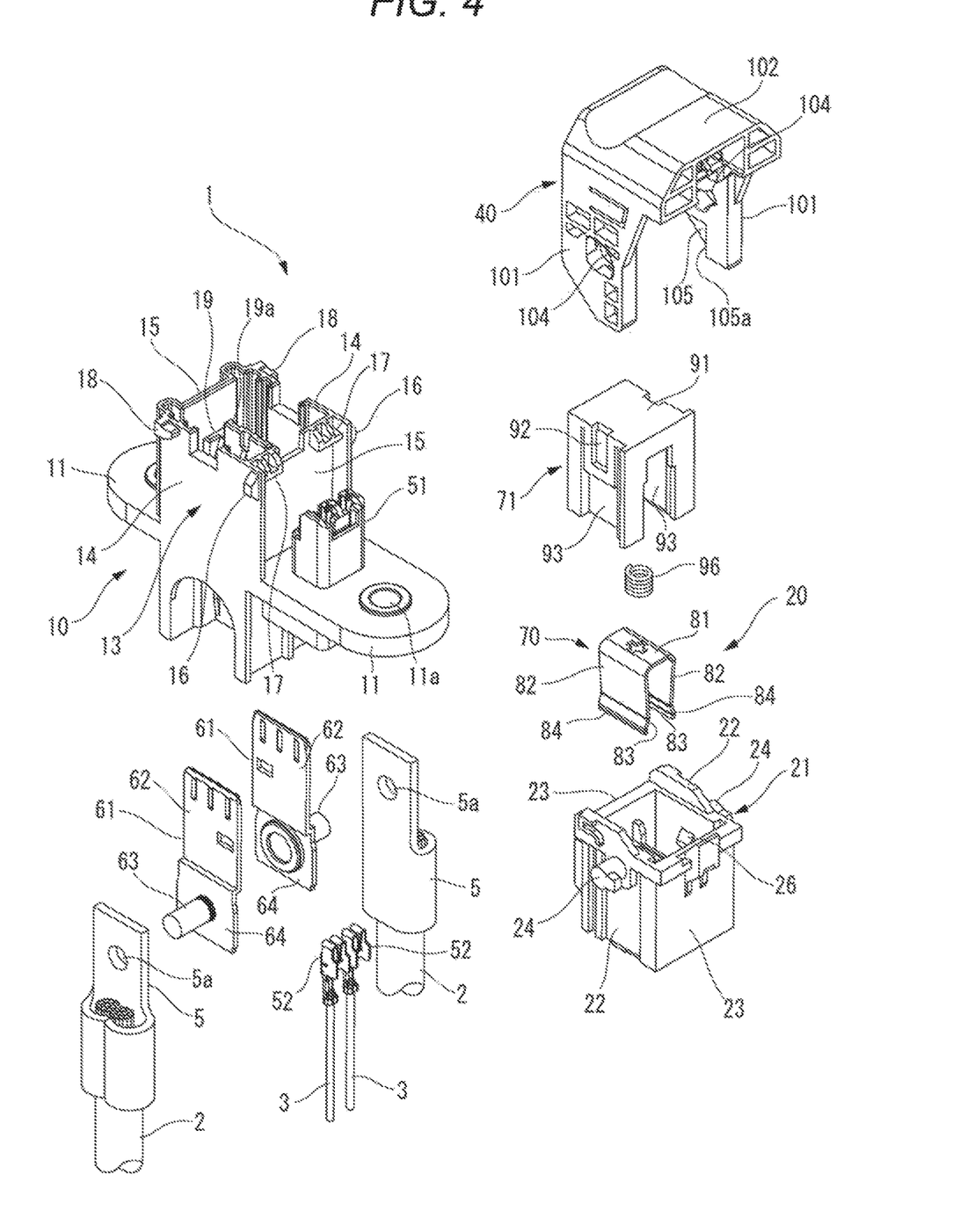
FIG. 4 is an exploded perspective view of the connector according to the present embodiment.
Figure 5:
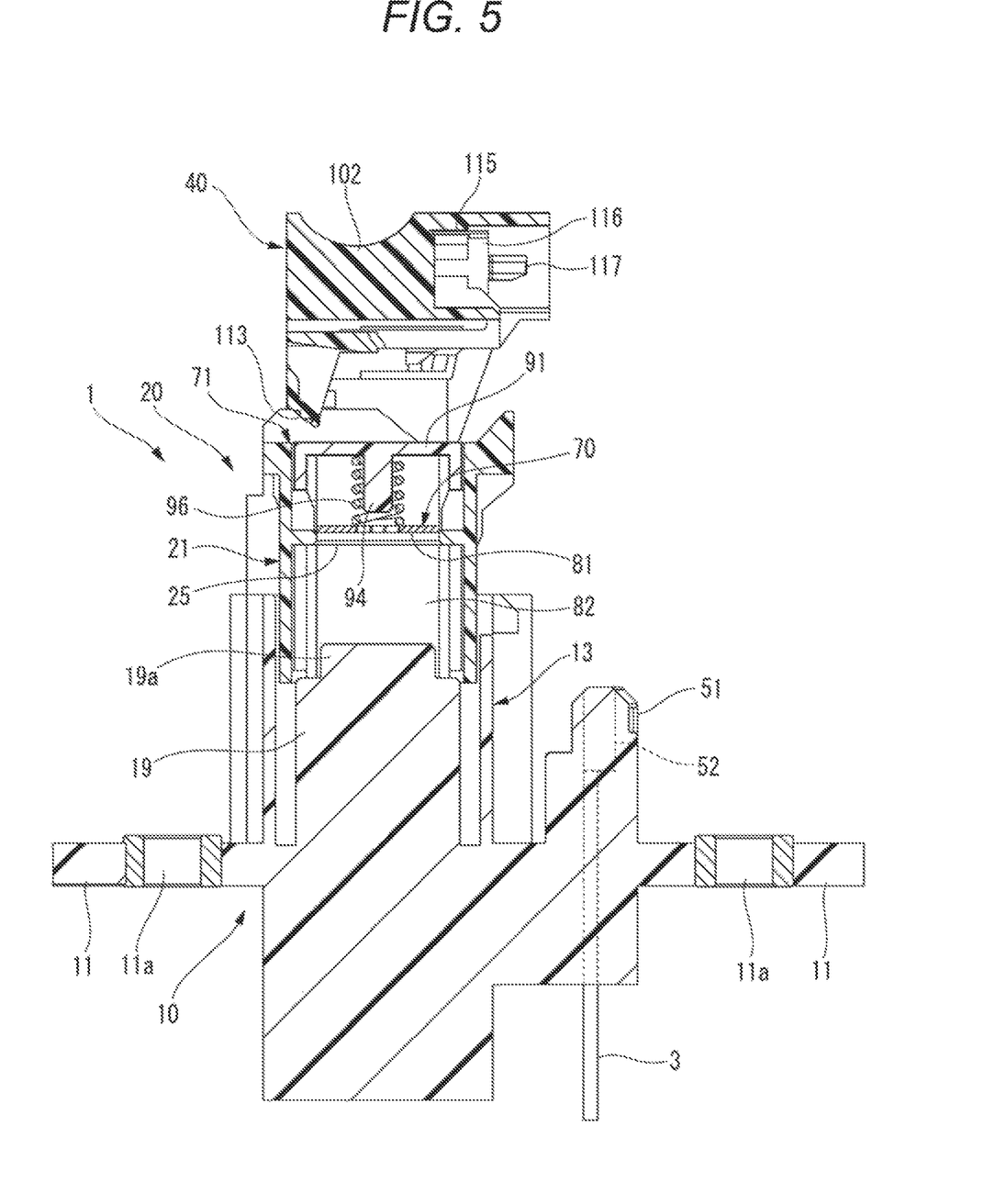
FIG. 5 is a cross-sectional view taken along a line A-A in FIG. 2.
Figure 6:
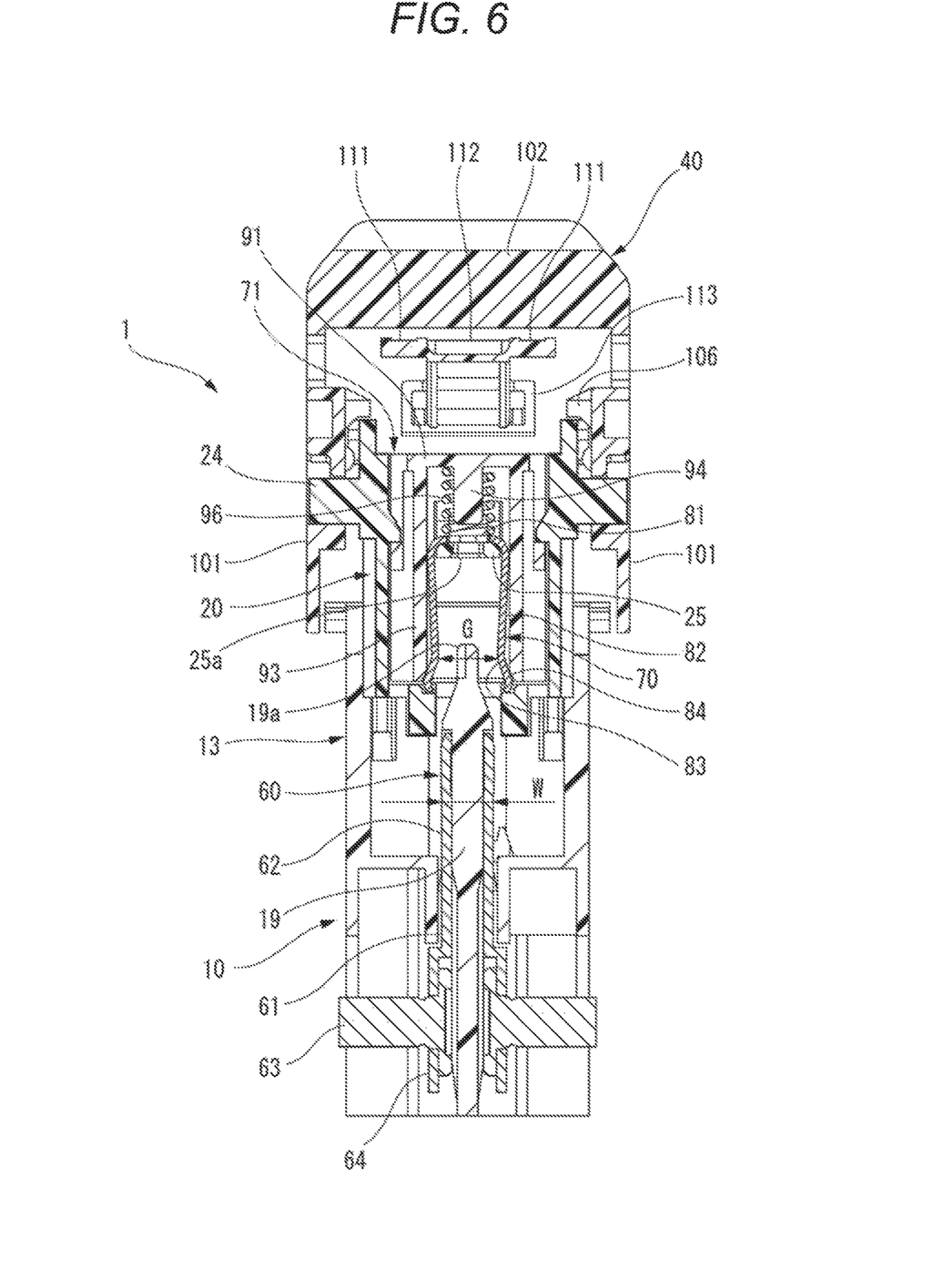
FIG. 6 is a cross-sectional view taken along a line B-B in FIG. 2.
Figure 7:
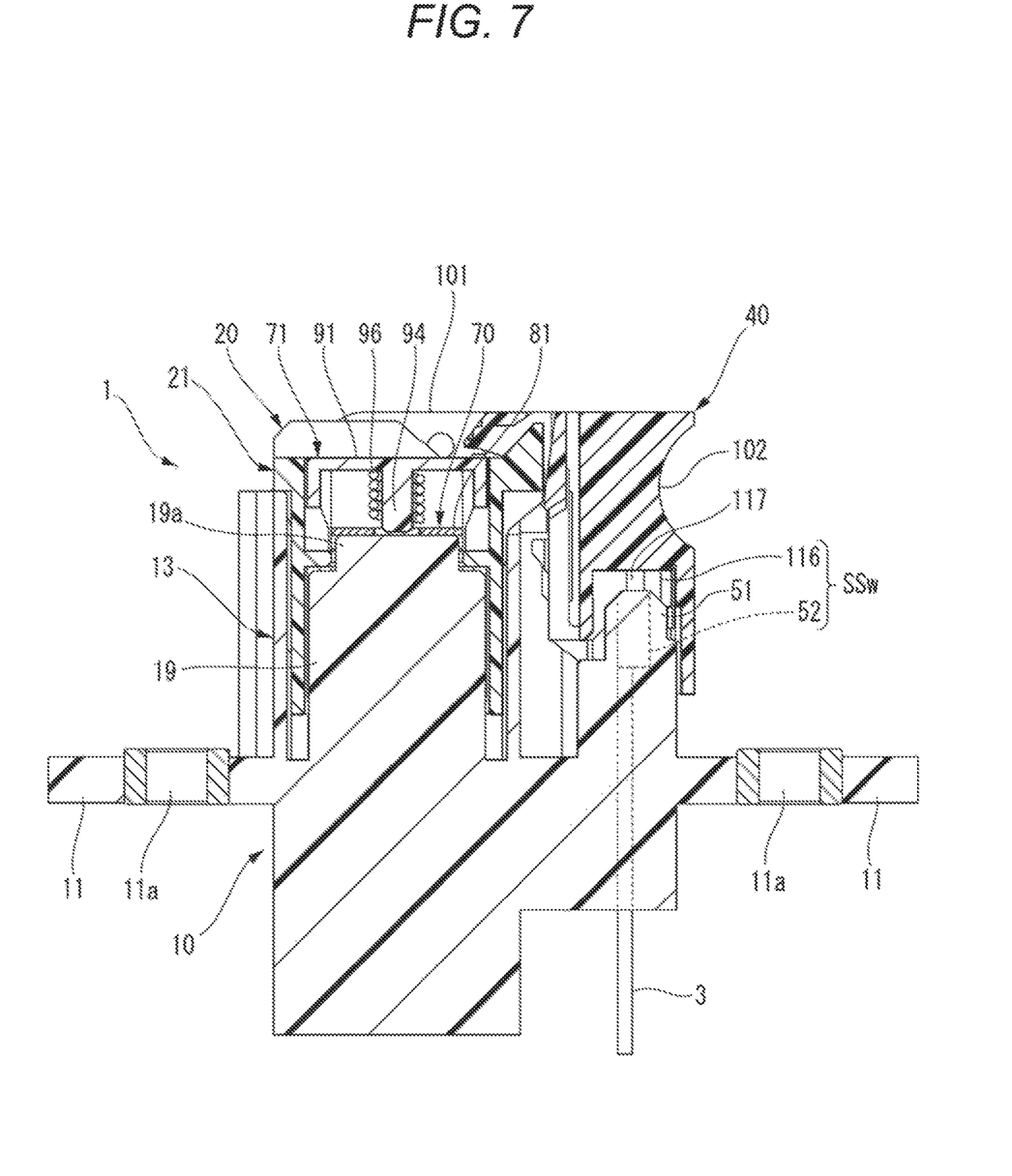
FIG. 7 is a cross-sectional view taken along a line C-C in FIG. 3.
Figure 8:
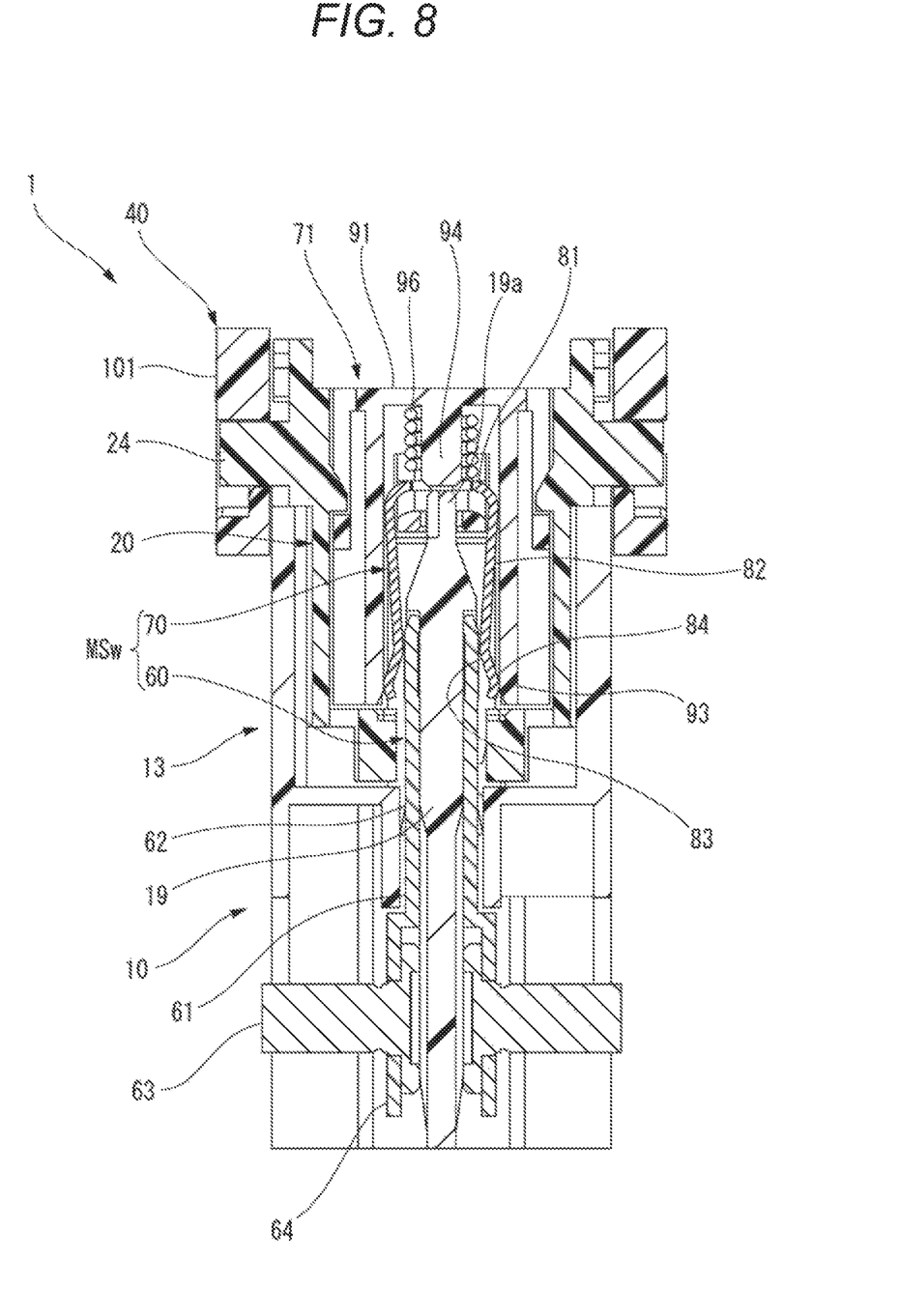
FIG. 8 is a cross-sectional view taken along a line D-D in FIG. 3.

FIG. 4 is an exploded perspective view of the connector according to the present embodiment. FIG. 5 is a cross-sectional view taken along a line A-A in FIG. 2. FIG. 6 is a cross-sectional view taken along a line B-B in FIG. 2. FIG. 7 is a cross-sectional view taken along a line C-C in FIG. 3. FIG. 8 is a cross-sectional view taken along a line D-D in FIG. 3.

As shown in FIGS. 4 to 8, the first connector housing 10 includes a flange portion 11 protruding outwards. The first connector housing 10 is attached to a power supply device or the like by fixing the flange portion 11 to a case thereof. Bolt insertion holes 11a are provided in the flange portion 11, and bolts (not shown) inserted into the bolt insertion holes 11a are screwed into bolt holes of the case of the power supply device or the like, whereby the first connector housing 10 is attached to the power supply device or the like.

The first connector housing 10 includes a housing tubular portion 13 whose upper side is opened. The housing tubular portion 13 is formed in a rectangular tubular shape having a rectangular shape in a plan view. The housing tubular portion 13 includes a pair of side plates 14 and a pair of end plates 15. A pair of main lock claws 16 protruding laterally from upper edges of the side plates 14 on one end of each of the pair of the side plates 14 of the housing tubular portion 13. Further, a pair of sub-lock claws 17 are provided on an upper edge of one of the pair of end plates 15 of the housing tubular portion 13 on one end side. Bosses 18 that protrude laterally are formed on upper edges near the other end of the side plates 14 of the housing tubular portion 13.

A terminal block SI erected from the flange portion 11 is provided on one end side of the first connector housing 10, and a pair of sub-terminals 52 are provided on the terminal block 51. Signal lines 3 are connected to these sub-terminals 52. The sub-terminals 52 are inserted into and mounted in the terminal block 51 from a lower side of the first connector housing 10.

The first connector housing 10 is provided with a pair of terminal plates 61 that are formed of a flat-plate shaped bus bar formed of a conductive metal material and that form a first terminal 60 inside the housing tubular portion 13. One end portion of the terminal plate 61 is a terminal plate portion 62, and the other end portion is a connection portion 64 including a bolt portion 63. The bolt portion 63 provided on the connection portion 64 of the terminal plate 61 is inserted through an insertion hole 5a of a connection terminal 5 provided on an end portion of a power supply line 2, and a nut (not shown) is fastened thereto. Accordingly, the power supply line 2 from the power supply device or the like is connected to the connection portion 64 of the terminal plate 61.

The respective terminal plate portions 62 of the terminal plates 61 are inserted into the first connector housing 10 from below, and are arranged with an insulation plate portion (plate portion) 19 formed of a part of the first connector housing 10 therebetween. A ridge portion 19a is formed on an upper end portion of the insulation plate portion 19. In the first connector housing 10, the first terminal 60 is formed with the terminal plate portions 62 of the pair of terminal plates 61 being overlapped with each other with the insulation plate portion 19 therebetween.

The second connector housing 20 includes a housing main body 21 formed in a rectangular tubular shape. The housing main body 21 includes a pair of side plates 22 and a pair of end plates 23. A pair of support shafts 24 protrude outward from the side plates 22 of the housing main body 21. Further, a holding plate portion 25 is formed in the housing main body 21. The holding plate portion 25 is integrally formed to bridge over inner surfaces of the end plates 23. An insertion window 25a is formed in the holding plate portion 25. Further, locking claws 26 are formed on inner surfaces of the respective end plates 23 in the housing main body 21.

A second terminal 70 and a holder 71 are attached the housing main body 21 from above.

The second terminal 70 is formed of a bus bar formed of a conductive metal material, and is formed in a substantially U shape in a side view including a flat plate portion 81 and a pair of contact pieces 82 that extend from the flat plate portion 81 in the same direction. The contact pieces 82 include contact portions 83 provided on surfaces of the contact pieces 82, the surfaces facing each other and being in the vicinity of tip ends of the contact pieces 82. Further, the contact pieces 82 include bulge portions 84 which are tip end portions of the contact pieces 82. The bulge portions 84 are formed by bending the tip end portions of the contact pieces 82 outward respectively such that the distance between the tip end portions increases toward tip ends thereof and the tip ends are slightly bent inward.

The second terminal 70 is attached to the housing main body 21 from above. Accordingly, the second terminal 70 is housed in the housing main body 21 in a state where the flat plate portion 81 is engaged with the holding plate portion 25 such that a downward movement of the flat plate portion 81 is restricted.

The holder 71 is formed of a resin material having electrical insulation properties. The holder 71 is formed in a box shape in which an upper portion of the holder 71 is closed by an upper surface plate 91. The holder 71 has an outer shape slightly smaller than an inner shape of the housing main body 21 in a plan view. The holder 71 is fitted and attached to the housing main body 21 from above. Locking grooves 92 are formed in both side portions of the holder 71, and the holder 71 is attached to the housing main body 21, whereby the locking claws 26 enter the engagement grooves 92. Accordingly, the holder 71 attached to the housing main body 21 is locked by the locking claws 26 and is maintained in a state of being attached to the housing main body 21.

The holder 71 includes a pair of pressing plate portions 93 facing each other. These pressing plate portions 93 extend downward in a direction to which the holder 71 is attached to the housing main body 21, and are arranged in parallel at intervals from each other.

A locking protrusion 94 is provided on an inner surface of the upper surface plate 91 in the holder 71. A coil spring (biasing member) 96 is fitted to the locking protrusion 94 from below of the holder 71. Accordingly, the coil spring 96 is attached to an inner surface side of the upper surface plate 91 of the holder 71.

When the holder 71 is attached to the housing main body 21, the second terminal 70 is disposed and housed between the pressing plate portions 93 of the holder 71. Then, the second terminal 70 is housed between the pressing plate portions 93, and is displaceable between (i) an initial position or a first position (see FIG. 6) at which a part of tip ends including the bulge portions 84 of the contact pieces 82 protrude from between the pressing plate portions 93, i.e. the tip ends including the bulge portions 84 of the contact pieces 82 extend beyond distal ends of the pressing plate portions 93, and (ii) a retracted position or a second position (see FIG. 8) at which the part of the tip ends including the bulge portions 84 of the contact pieces 82 completely housed between the pressing plate portions 93 such that the part of the tip ends do not protrude from between the pressing plate portions 93.

When the holder 71 is attached to the housing main body 21, the coil spring 96 is disposed between the upper surface plate 91 of the holder 71 and the flat plate portion 81 of the second terminal 70 engaged with the holding plate portion 25. Accordingly, the second terminal 70 is biased toward the initial position by an elastic force of the coil spring 96, and the flat plate portion 81 abuts the holding plate portion 25. In the second terminal 70, a gap G larger than a width dimension W of the first terminal 60 is formed between the contact portions 83 of the contact pieces 82 at the initial position in which a part including the bulge portions 84 of the contact pieces 82 protrudes from between the pressing plate portions 93 (see FIG. 6).

The lever 40 is molded from a synthetic resin and includes a pair of arm portions 101 and a coupling portion 102. One end side of the arm portion 101 is connected to the coupling portion 102, and a vicinity of the other end includes a bearing hole 104. The support shaft 24 of the second connector housing 20 is to be inserted into the bearing hole 104 of the arm portion 101, whereby the lever 40 is rotatably supported at the second connector housing 20. The lever 40 includes cam concave portions 105 having drawn-in surfaces 105a at the other ends of the arm portions 101.

The lever 40 rotatably supported at the second connector housing 20 rotates between a detachment operation position (see FIG. 2) along the insertion and removal direction X and a finally fitted operation position (see FIG. 3) along a direction orthogonal to the insertion and removal direction X.

On the arm portion 101 of the lever 40, a main lock protrusion 106 is formed in the vicinity of the coupling portion 102. These main lock protrusions 106 lock the main lock claws 16 formed on the housing tubular portion 13 of the first connector housing 10. Then, the main lock claws 16 and the main lock protrusions 106 form a main lock unit MR (see FIG. 2). In the main lock unit MR, the main lock protrusions 106 lock the main lock claws 16 and lock the lever 40 with respect to the first connector housing 10 in a state where the lever 40 is disposed at the finally fitted operation position, thereby restricting the rotation of the lever 40. Then, in the connector 1, a state where the lever 40 is disposed at the finally fitted operation position and is locked by the main lock unit MR is referred to as a finally fitted state (FIGS. 3, 7 and 8). Further, in the connector 1, a state where the lever 40 is disposed at the detachment operation position and the second connector housing 20 is withdrawn from the housing tubular portion 13 of the first connector housing 10 with a part of the second connector housing 20 left therein is referred to as a detached state (see FIGS. 2, 5, and 6).

A sub-lock plate portion 112 including two sub-lock pieces 111 is formed on the coupling portion 102 of the lever 40. Further, a lock release portion 113 is formed on the sub-lock plate portion 112 (see FIG. 6).

The sub-lock pieces 111 of the sub-lock plate portion 112 can be locked to the sub-lock claws 17 formed on the housing tubular portion 13 of the first connector housing 10. Then, the sub-lock claw 17 and the sub-lock piece 111 form a sub-lock unit SR (see FIG. 2). In the sub-lock unit SR, the sub-lock pieces 111 lock the sub-lock claws 17 during rotation of the lever 40 from the finally fitted operation position to the detachment operation position, thereby restricting the rotation of the lever 40. A position at which the lever 40 is locked by the sub-lock unit SR during the rotation from the finally fitted operation position to the detachment operation position is referred to as a temporarily fitted operation position. Then, in the connector 1, a state where the lever 40 is locked at the temporarily fitted operation position is referred to as a temporarily fitted state. In the temporarily fitted state, the lock release portion 113 of the sub-lock plate portion 112 is pressed and elastically deformed, thereby releasing the locking of the sub-lock pieces 111 with respect to the sub-lock claws 17. Accordingly, the lever 40 locked at the temporarily fitted operation position can be rotated again toward the detachment operation position.

The coupling portion 102 of the lever 40 is formed with a bus bar holding portion 115, and the bus bar holding portion 115 is provided with a short terminal 116. The short terminal 116 includes a pair of tab portions 117. The tab portions 117 of the short terminal 116 can be connected to the sub-terminals 52 of the first connector housing 10. When the tab portions 117 of the short terminal 116 are connected to the sub-terminals 52, the signal lines 3 connected to the sub-terminals 52 are electrically conducted with each other via the short terminal 116.

In the connector 1 having the above configuration, the first terminal 60 and the second terminal 70 form a main switch unit (switch unit) MSw (see FIG. 8), and the sub-terminals 52 and the short terminal 116 form a sub-switch unit SSw (see FIG. 7). In a power supply device or the like including the connector 1 as the power supply circuit cut-off device, a power supply circuit is formed by turning on the main switch unit MSw and electrically conducting the power supply lines 2 with each other, and a signal circuit is formed by turning on the sub-switch unit SSw and electrically conducting the signal lines 3 with each other. Then, in the power supply device or the like including the power supply circuit cut-off device, even when the main switch unit MSw is turned on and the power supply circuit is formed, the power supply circuit is not in a conductive state unless the sub-switch unit SSw is turned on and the signal circuit is formed. That is, the power supply circuit becomes the conductive state only after the main switch unit MSw and the sub-switch unit SSw are both turned on.

Figure 9A:
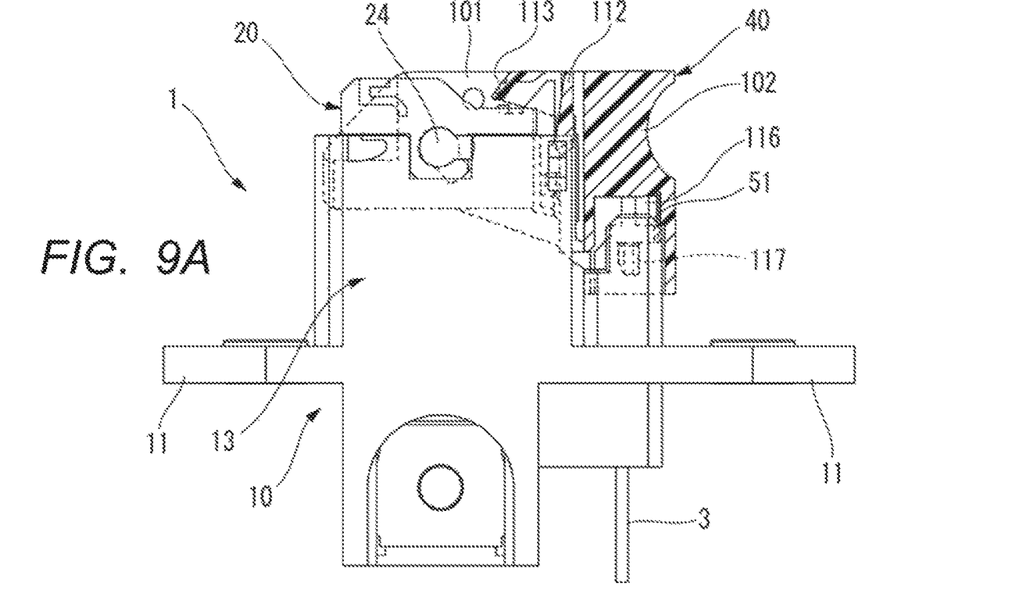
Figure 9B:
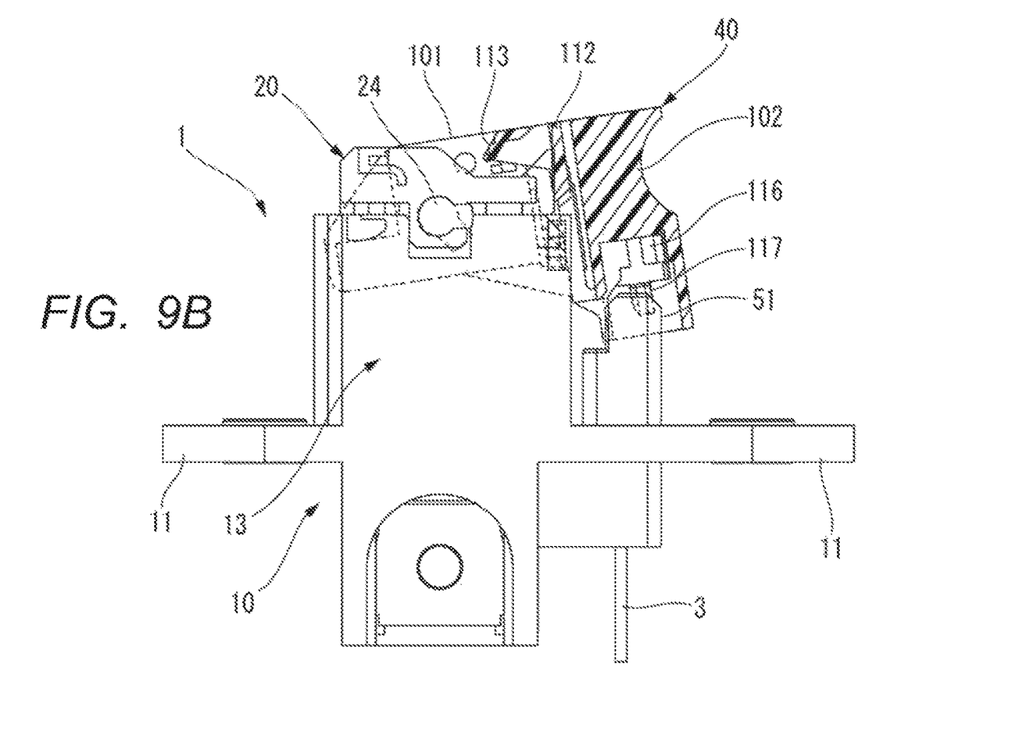
FIG. 9B is a partial cross-sectional side view of the connector in a temporarily fitted state.
Figure 10A:
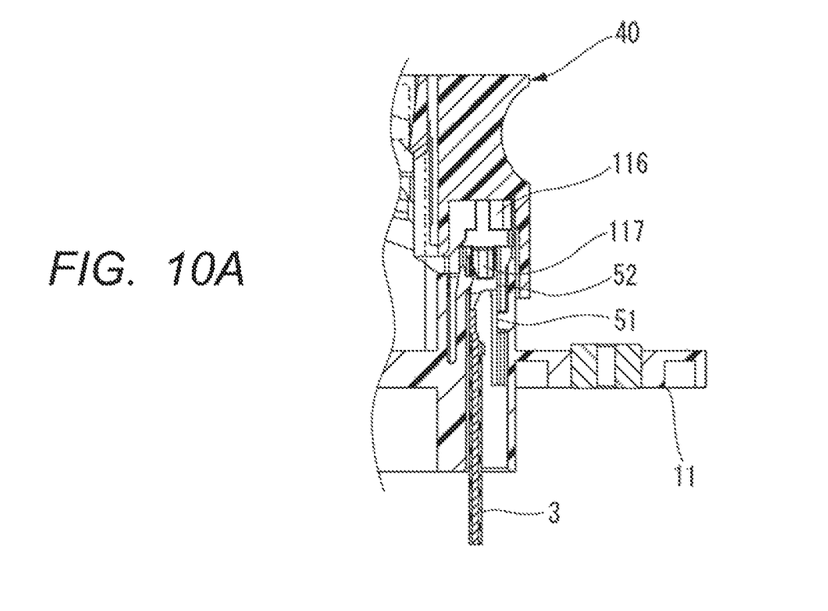
Figure 10B:
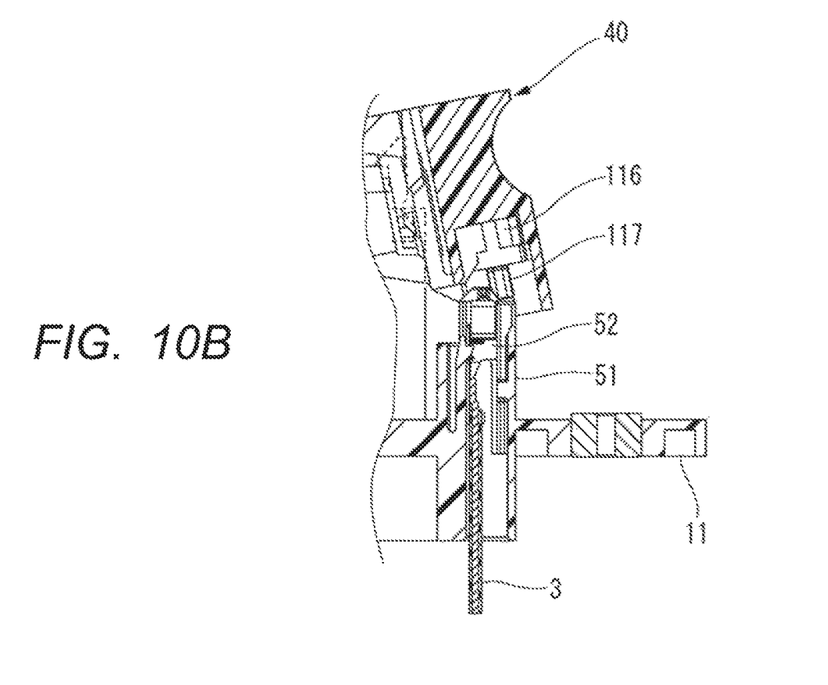
FIG. 10B is a cross-sectional view of the sub-switch unit of the connector in the temporarily fitted state.
Figure 11:
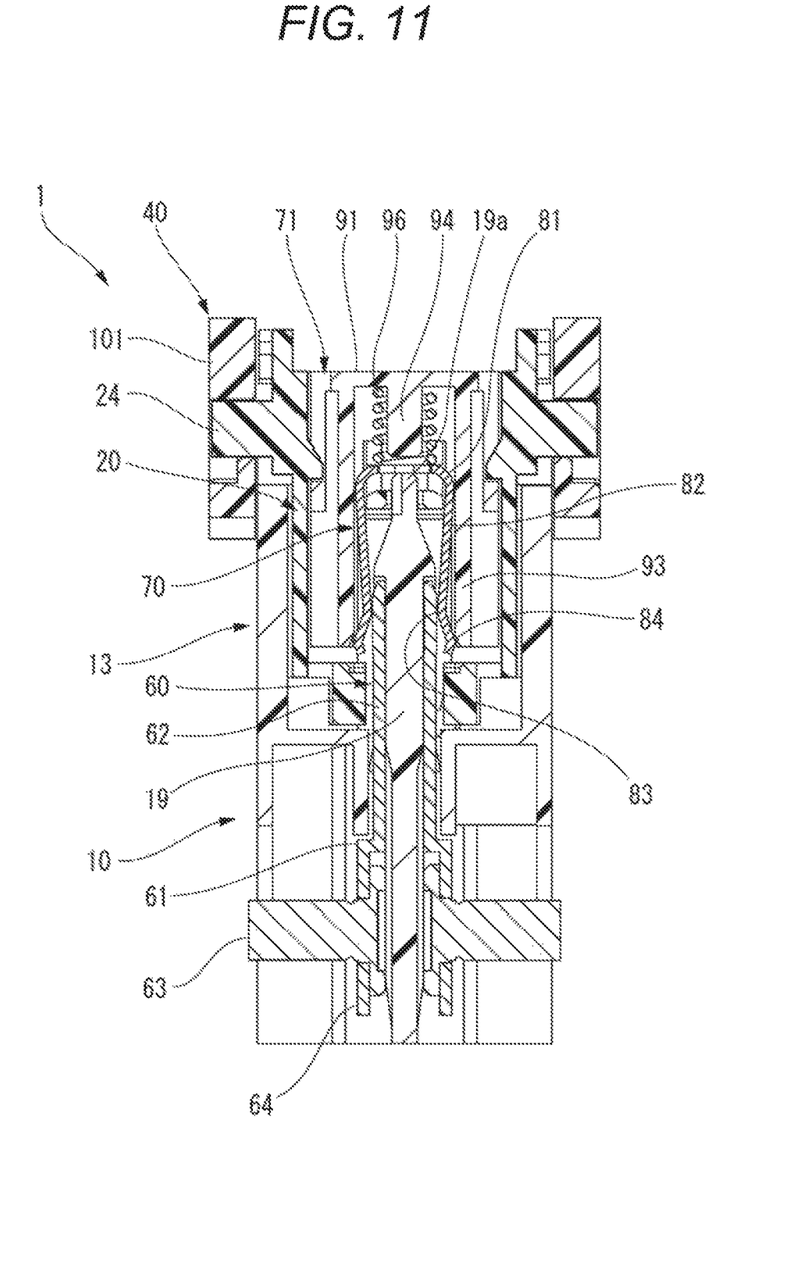
FIG. 11 is a cross-sectional view taken along a width direction of the connector in the temporarily fitted state.

Next, a case where the second connector housing 20 is fitted to and detached from the first connector housing 10 in the connector 1 will be described. FIGS. 9A and 9B show states of the connector. FIG. 9A is a partially cross-sectional side view of the connector in the finally fitted state. FIG. 9I is a partially cross-sectional side view of the connector in the temporarily fitted state. FIGS. 10A and 10B show states of the sub-switch unit of the connector. FIG. 10A is a cross-sectional view of the sub-switch unit of the connector in the finally fitted state. FIG. 10B is a cross-sectional view of the sub-switch unit of the connector in the temporarily fitted state. FIG. 11 is a cross-sectional view taken along a width direction of the connector in the temporarily fitted state.

In order to fit the second connector housing 20 to the first connector housing 10, the second connector housing 20 with the lever 40 being disposed at the detachment operation position is brought close to the first connector housing 10. Then, the second connector housing 20 is fitted into the housing tubular portion 13 of the first connector housing 10. Then, the bosses 18 are arranged in the cam concave portions 105 formed in the arm portions 101 of the lever 40.

In this state, the second terminal 70 is separated from the first terminal 60. That is, the main switch unit MSw is turned off, and the power supply lines 2 are in a non-connected state. Further, the tab portions 117 of the short terminal 116 are also separated from the sub-terminals 52. That is, the sub-switch unit SSw is turned off, and the signal lines 3 connected to the sub-terminals 52 are in the non-connected state.

From this state, the lever 40 at the detachment operation position is rotated toward the finally fitted operation position. Then, the bosses 18 of the first connector housing 10 arranged in the cam concave portions 105 of the lever 40 are relatively pushed up by the drawn-in surfaces 105a with the rotation of the lever 40. Accordingly, a fitting force is applied between the first connector housing 10 and the second connector housing 20, and the second connector housing 20 is drawn into the first connector housing 10.

When the second connector housing 20 is drawn into the first connector housing 10, the first terminal 60 is inserted between the contact pieces 82 of the second terminal 70 of the second connector housing 20. At this time, since the gap G of the contact portions 83 of the contact pieces 82 is larger than the width dimension W of the first terminal 60, the contact portions 83 do not slide on the terminal plate portions 62 of the terminal plates 61 of the first terminal 60.

When the second connector housing 20 is drawn into the first connector housing 10, the ridge portion 19a of the insulation plate portion 19 of the first terminal 60 is inserted into the insertion window 25a of the holding plate portion 25 and abuts the flat plate portion 81 of the second terminal 70, and movement of the second terminal 70 is restricted.

Thereafter, when the lever 40 reaches the finally fitted operation position, the finally fitted state is established in which the first connector housing 10 and the second connector housing 20 are completely fitted to each other. When the finally fitted state is established, in the second connector housing 20, the housing main body 21 and the holder 71 are drawn into the first connector housing 10 with respect to the second terminal 70 whose movement is restricted, and the second terminal 70 is pushed into the holder 71 against the elastic force of the coil spring 96. Then, the second terminal 70 disposed at the initial position is relatively displaced to the retracted position at which the second terminal 70 is completely retracted into the gap between the pressing plate portions 93 of the holder 71, and the contact pieces 82 of the second terminal 70 are pressed toward the first terminal 60 by the pressing plate portions 93. Accordingly, the contact portions 83 of the contact pieces 82 are pressed against and in contact with the terminal plate portions 62 of the terminal plates 61 of the first terminal 60. That is, the main switch unit MSw is turned on, and the power supply lines 2 connected to the terminal plates 61 are electrically connected to each other via the second terminal 70.

As shown in FIGS. 9A and 10A, when the lever 40 reaches the finally fitted operation position and the connector 1 is in the finally fitted state, the tab portions 117 of the short terminal 116 are inserted into the sub-terminals 52 and connected thereto. That is, the sub-switch unit SSw is turned on, and the signal lines 3 connected to the sub-terminals 52 are electrically connected to each other via the short terminal 116.

When the connector 1 is in the finally fitted state, in the main lock unit MR, the main lock protrusions 106 of the lever 40 are engaged with the main lock claws 16 of the housing tubular portion 13. Accordingly, the lever 40 is locked in a state where the lever 40 is disposed at the finally fitted operation position, and the rotation of the lever 40 is restricted. In this way, in the finally fitted state, the main lock unit MR restricts the rotation of the lever 40, whereby the first connector housing 10 and the second connector housing 20 are locked in a completely fitted state, and the finally fitted state is maintained.

In order to detach the second connector housing 20 from the first connector housing 10, the lever 40 disposed at the finally fitted operation position is gripped and pulled up. Then, the main lock protrusions 106 of the lever 40 are disengaged from the main lock claws 16 of the housing tubular portion 13, the lock of the lever 40 by the main lock unit MR that maintains the finally fitted state is released, and the lever 40 becomes rotatable.

When the rotatable lever 40 is rotated toward the detachment operation position, the rotating lever 40 reaches the temporarily fitted operation position. Then, the sub-lock pieces 111 of the sub-lock plate portion 112 that form the sub-lock unit SR are locked to the sub-lock claws 17 of the housing tubular portion 13. Accordingly, as shown in FIGS. 9B and 10B, the lever 40 is locked at the temporarily fitted operation position to restrict the rotation, and the first connector housing 10 and the second connector housing 20 are in the temporarily fitted state. When the temporarily fitted state is established, the tab portions 117 of the short terminal 116 are pulled out from the sub-terminals 52. That is, the sub-switch unit SSw is turned off, and the electrical connection between the signal lines 3 is cut off.

As shown in FIG. 11, in the temporarily fitted state, the contact portions 83 of the contact pieces 82 are continuously maintained in a state of being in contact with each other. That is, the main switch unit MSw is continuously turned on, the terminal plates 61 are conducted by the second terminal 70, and the power supply lines 2 are maintained in a state of being electrically connected to each other.

The lock release portion 113 of the sub-lock unit SR is pressed from the temporarily fitted state, and the lock by the sub-lock unit SR is released. Then, the rotatable lever 40 is rotated again toward the detachment operation position. When the lever 40 that has reached the detachment operation position is pulled up, a detachment force is applied between the first connector housing 10 and the second connector housing 20, and the second connector housing 20 is pulled out from the housing tubular portion 13 of the first connector housing 10. At this time, with displacement of the second connector housing 20, the second terminal 70 disposed at the retracted position is pushed out from between the pressing plate portions 93 of the holder 71 of the second connector housing 20 by the elastic force of the coil spring 96, and returns to the initial position. Then, in the second terminal 70, the bulge portions 84 of the contact pieces 82 are pushed out from between the pressing plate portions 93, and the pressing of the contact pieces 82 toward the first terminal 60 by the pressing plate portions 93 is released. Accordingly, the contact pieces 82 are displaced outward such that the contact portions 83 of the contact pieces 82 are separated from the terminal plate portions 62 of the terminal plates 61 of the first terminal 60.

Thereafter, the second terminal 70 is separated from the first terminal 60 together with the holder 71 by movement of the second connector housing 20 in a pulling-out direction. Accordingly, the first terminal 60 is pulled out from between the contact pieces 82 of the second terminal 70. Accordingly, the main switch unit MSw is turned off, and the electrical connection between the power supply lines 2 is cut off. At this time, since the gap G of the contact portions 83 of the contact pieces 82 is larger than the width dimension W of the first terminal 60, the contact portions 83 do not slide on the terminal plate portions 62 of the terminal plates 61 of the first terminal 60.

In the connector 1, the main switch unit MSw is turned on in the finally fitted state locked by the main lock unit MR and in the temporarily fitted state locked by the sub-lock unit SR; the sub-switch unit SSw is turned on in the finally fitted state locked by the main lock unit MR and is turned off in the temporarily fitted state locked by the sub-lock unit SR. Therefore, after the sub-switch unit SSw is turned off and the electrical connection between the signal lines 3 is cut off, unless the lock by the sub-lock unit SR is released, the main switch unit MSw cannot be turned off and the electrical connection between the power supply lines 2 cannot be cut off. Therefore, it is possible to prevent occurrence of an arc, a spark, or the like caused by a residual current generated when the connection between the power supply lines 2 is released immediately after the connection between the signal lines 3 is released.

As described above, according to the connector 1 in the present embodiment, the contact pieces 82 of the second terminal 70 are arranged such that the contact pieces 82 face each other with a gap G larger than the width dimension W of the first terminal 60. Therefore, when the second connector housing 20 is fitted to and detached from the first connector housing and the first terminal 60 is inserted into and removed from between the contact pieces 82, the contact pieces 82 of the second terminal 70 do not slide on the terminal plate portions 62 of the first terminal 60. When the second connector housing 20 is completely fitted to the first connector housing 10 and the second terminal 70 is displaced to the retracted position, the contact pieces 82 are pressed toward the first terminal 60 respectively by the pressing plate portions 93. Accordingly, the contact pieces 82 of the second terminal 70 are in contact with the terminal plate portions 62 of the first terminal 60 to be conducted, and a good conduction state is ensured.

That is, since the terminal plate portions 62 of the first terminal 60 and the contact pieces 82 of the second terminal 70 do not slide on each other, scraping of surfaces of the first terminal 60 and the second terminal 70 can be prevented, and generation of the scraped metal powder can be prevented. In particular, when a plating treatment has been performed on the surfaces of the first terminal 60 and the second terminal 70, it is possible to prevent a defect such as an increase in electrical resistance caused by oxidation of an exposed base by the plating being removed. Therefore, high connection reliability between the first terminal 60 and the second terminal 70 connected to each other can be maintained.

In addition, the second connector housing 20 includes the coil spring 96 that biases the second terminal 70 toward the initial position. Therefore, when the second connector housing is separated from the first connector housing 10, the second terminal 70 can be smoothly returned to the initial position by the coil spring 96 without being affected by an external force such as gravity. Accordingly, paying much attention is not necessary for the posture of the second connector housing 20 during the second connector housing 20 is being installed in the first connector housing 10.

The second connector housing 20 includes the rotatably supported lever 40. When the lever 40 is rotated, a fitting force is applied to the first connector housing 10. Therefore, when the lever 40 is rotated, the fitting of the second connector housing 20 to the first connector housing 10 can be easily performed with a small operation force. Accordingly, the connector 1 having excellent operability can be provided.

According to the power supply circuit cut-off device including the connector 1, since the main switch unit MSw including the first terminal 60 and the second terminal 70 that have the high connection reliability is provided, high reliability is obtained.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, although the lever 40 is provided as an element which applies a fitting force between the second connector housing 20 and the first connector housing 10 by rotating in the above embodiment, the lever 40 may not necessarily be provided.

In the above embodiment, although the coil spring 96 is provided as a biasing member that biases the second terminal 70 toward the initial position, the biasing member is not limited to the coil spring 96. For example, a spring piece serving as the biasing member may be integrally formed on an inner surface of the upper surface plate 91 of the holder 71 or an upper surface of the flat plate portion 81 of the second terminal 70.

According to an aspect of the embodiments described above, a connector includes a first connector housing (10), a second connector housing (20) configured to be fitted to and detached from the first connector housing (10), a first terminal (60) provided in the first connector housing (10), the first terminal (60) including a pair of terminal plate portions (62) with a plate portion (insulation plate portion 19) provided between the pair of terminal plate portions (62), the plate portion (insulation plate portion 19) having an electrical insulation property, and a second terminal (70) provided in the second connector housing (20), the second terminal (70) having a U shape, the second terminal (70) including contact pieces (82) facing each other with a gap (G) between the contact pieces (82), the gap (G) being larger than a width dimension (W) of the first terminal (60), the first terminal (60) being configured to be inserted into the gap (0) when the second connector housing (20) is fitted to the first connector housing (10), the first terminal (60) being configured to be removed from the gap (G) when the second connector housing (20) is detached from the first connector housing (10). The second connector housing (20) includes a pair of pressing plate portions (93) extending toward a direction in which the second connector housing (20) is fitted to the first connector housing (10). The second terminal (70) is configured to be accommodated between the pressing plate portions (93), the second terminal (70) being configured to be displaceable between a first position (initial position) and a second position (retracted position), a part of the contact pieces (82) being configured to extend beyond distal ends of the pressing plate portions (93) when the second terminal (70) is in the first position (initial position), the part of the contact pieces (82) being configured to be completely retracted into a space between the pressing plate portions (93) such that the part of the contact pieces (82) do not extend beyond the distal ends of the pressing plate portions (93) when the second terminal (70) is in the second position (retracted position). The second terminal (70) is configured to be displaced from the first position (initial position) to the second position (retracted position) by the second terminal (70) being retracted into the space between the pressing plate portions (93) when the second connector housing (20) is completely fitted to the first connector housing (10) (finally fitted state), the contact pieces (82) being configured to be pushed toward the first terminal (60) by the pressing plate portions (93) such that the contact pieces (82) contact the terminal plate portions (62).

According to the connector having the above-described configuration, the contact pieces of the second terminal are arranged such that the contact pieces face each other with the gap therebetween, the gap being larger than the width dimension of the first terminal. Therefore, when the second connector housing is fitted to and detached from the first connector housing and the first terminal is inserted into and removed from between the contact pieces, the contact pieces of the second terminal do not slide on the terminal plate portions of the first terminal. When the second connector housing is completely fitted to the first connector housing and the second terminal is put into the retracted position, the contact pieces are pressed toward the first terminal respectively by the pressing plate portions. Accordingly, the contact pieces of the second terminal am in contact with the terminal plate portions of the first terminal to be conducted, and a good conduction state is ensured. That is, since the terminal plate portions of the first terminal and the contact pieces of the second terminal do not slide on each other, scraping of surfaces of the first terminal and the second terminal can be prevented, and generation of the scraped metal powder can be prevented. In particular, when a plating treatment has been performed on the surfaces of the first terminal and the second terminal, it is possible to prevent a defect such as an increase in electrical resistance caused by oxidation of an exposed base by the plating being removed. Therefore, high connection reliability between the first terminal and the second terminal connected to each other can be maintained.

The second connector housing (20) may include a biasing member (for example, a coil spring 96) configured to bias the second terminal (70) toward the first position (initial position).

According to the connector having the above configuration, when the second connector housing is separated from the first connector housing, the second terminal can be smoothly returned to the initial position by the biasing member without being affected by an external force such as gravity. Accordingly, paying much attention is not necessary for the posture of the second connector housing during the second connector housing is being installed in the first connector housing.

The second connector housing (20) may include a lever (40) rotatably supported at the second connector housing (20). The lever (40) is configured to apply a force to the second connector housing (20) by the lever (40) being rotated such that the second connector housing (20) is fitted to the first connector housing (10).

According to the connector having the above configuration, the fitting of the second connector housing to the first connector housing can be easily performed with a small operation force of rotating the lever. Accordingly, the connector having excellent operability can be provided.

The contact pieces (82) may include contact portions (83) facing each other and being in the vicinity of tip ends of the contact pieces (82), the contact pieces (82) further including bulge portions (84) being tip end portions of the contact pieces (82), the bulge portions (84) being formed by bending the tip end portions outward respectively such that a distance between the tip end portions increases toward the tip ends of the contact pieces (82).

A power supply circuit cut-off device may include the connector (I). The first terminal (60) and the second terminal (70) may be configured to function as a switch unit (for example, a main switch unit MSw), the switch unit (main switch unit MSw) being configured to turn on and off a power supply circuit.

According to the power supply circuit cut-off device having the above configuration, since the switch unit including the first terminal and the second terminal that have high connection reliability is provided, high reliability is obtained.

The power supply circuit cut-off device may include a sub-switch unit (SSw) configured, when the second connector housing (20) is completely fitted to the first connector housing (10), to be turned on at the same time as the switch unit (main switch unit MSw) is turned on, the sub-switch unit (SSw) being configured to cut off electric conduction of a circuit of the switch unit (main switch unit MSw) by the sub-switch unit (SSw) being turned off in a temporarily fitted state of the first connector housing (10) and the second connector housing (20) in which the switch unit (main switch unit MSw) is kept turned on while the second connector housing (20) is withdrawn from the first connector housing (10).

According to the power supply circuit cut-off device having the above configuration, when the second connector housing is moved from the finally fitted state to the temporarily fitted state, the sub-switch unit is turned off, and the switch unit in which the electric conduction of the circuit is cut off is maintained in the on state. Therefore, timing at which the switch unit is turned off with respect to timing at which the sub-switch unit is turned off is delayed, so that it is possible to prevent occurrence of an arc, a spark, or the like caused by a residual current in the circuit.

What is claimed is:

1. A connector comprising:
a first connector housing;
a second connector housing configured to be fitted to and detached from the first connector housing;
a first terminal provided in the first connector housing, the first terminal comprising a pair of terminal plate portions with a plate portion provided between the pair of terminal plate portions, the plate portion having an electrical insulation property; and a second terminal provided in the second connector housing, the second terminal having a U shape, the second terminal comprising contact pieces facing each other with a gap between the contact pieces, the gap being larger than a width dimension of the first terminal, the first terminal being configured to be inserted into the gap when the second connector housing is fitted to the first connector housing, the first terminal being configured to be removed from the gap when the second connector housing is detached from the first connector housing, wherein the second connector housing comprises a pair of pressing plate portions extending toward a direction in which the second connector housing is fitted to the first connector housing, wherein the second terminal is configured to be accommodated between the pressing plate portions, the second terminal being configured to be displaceable between a first position and a second position, a part of the contact pieces being configured to extend beyond distal ends of the pressing plate portions when the second terminal is in the first position, the part of the contact pieces being configured to be completely retracted into a space between the pressing plate portions such that the part of the contact pieces do not extend beyond the distal ends of the pressing plate portions when the second terminal is in the second position, and wherein the second terminal is configured to be displaced from the first position to the second position by the second terminal being retracted into the space between the pressing plate portions when the second connector housing is completely fitted to the first connector housing, the contact pieces being configured to be pushed toward the first terminal by the pressing plate portions such that the contact pieces contact the terminal plate portions.

2. The connector according to claim 1,
wherein the second connector housing comprises a biasing member configured to bias the second terminal toward the first position.

3. The connector according to claim 1,
wherein the second connector housing comprises a lever rotatably supported at the second connector housing, and
wherein the lever is configured to apply a force to the second connector housing by the lever being rotated such that the second connector housing is fitted to the first connector housing.

4. The connector according to claim 1,
wherein the contact pieces comprise contact portions facing each other and being in the vicinity of tip ends of the contact pieces, the contact pieces further comprising bulge portions being tip end portions of the contact pieces, the bulge portions being formed by bending the tip end portions outward respectively such that a distance between the tip end portions increases toward the tip ends of the contact pieces.

5. A power supply circuit cut-off device comprising a connector comprising:

a first connector housing;

a second connector housing configured to be fitted to and detached from the first connector housing;

a first terminal provided in the first connector housing, the first terminal comprising a pair of terminal plate portions with a plate portion provided between the pair of terminal plate portions, the plate portion having an electrical insulation property; and a second terminal provided in the second connector housing, the second terminal having a U shape, the second terminal comprising contact pieces facing each other with a gap between the contact pieces, the gap being larger than a width dimension of the first terminal, the first terminal being configured to be inserted into the gap when the second connector housing is fitted to the first connector housing, the first terminal being configured to be removed from the gap when the second connector housing is detached from the first connector housing, wherein the second connector housing comprises a pair of pressing plate portions extending toward a direction in which the second connector housing is fitted to the first connector housing, wherein the second terminal is configured to be accommodated between the pressing plate portions, the second terminal being configured to be displaceable between a first position and a second position, a part of the contact pieces being configured to extend beyond distal ends of the pressing plate portions when the second terminal is in the first position, the part of the contact pieces being configured to be completely retracted into a space between the pressing plate portions such that the part of the contact pieces do not extend beyond the distal ends of the pressing plate portions when the second terminal is in the second position, wherein the second terminal is configured to be displaced from the first position to the second position by the second terminal being retracted into the space between the pressing plate portions when the second connector housing is completely fitted to the first connector housing, the contact pieces being configured to be pushed toward the first terminal by the pressing plate portions such that the contact pieces contact the terminal plate portions, and wherein the first terminal and the second terminal are configured to function as a switch unit, the switch unit being configured to turn on and off a power supply circuit.

6. The power supply circuit cut-off device according to claim 5, further comprising:

a sub-switch unit configured to be turned on, when the second connector housing is completely fitted to the first connector housing, at the same time as the switch unit is turned on, the sub-switch unit being configured to cut off electric conduction of a circuit of the switch unit by the sub-switch unit being turned off in a temporarily fitted state of the first connector housing and the second connector housing in which the switch unit is kept turned on while the second connector housing is withdrawn from the first connector housing.

\* \* \* \* \*